United States Patent
Topar

[19]

[11] Patent Number: 5,975,357
[45] Date of Patent: Nov. 2, 1999

[54] BEVERAGE DISPENSING APPARATUS HAVING CONSISTENT MIX DELIVERY OF BEVERAGE TO CONTAINER

[76] Inventor: William M. Topar, 4664 W. Puget Ave., Glendale, Ariz. 85302

[21] Appl. No.: 08/994,246

[22] Filed: Dec. 19, 1997

Related U.S. Application Data

[60] Provisional application No. 60/034,070, Dec. 24, 1996.

[51] Int. Cl.⁶ .................................................. B67D 5/56
[52] U.S. Cl. ........................... 222/56; 222/64; 222/129.3; 222/145.5; 222/189.06; 222/190; 222/413
[58] Field of Search ........................... 222/56, 64, 129.1, 222/129.3, 145.5, 145.6, 189.06, 190, 413

[56] References Cited

U.S. PATENT DOCUMENTS

| | | | |
|---|---|---|---|
| 3,266,670 | 8/1966 | Brooks et al. | 222/54 |
| 3,568,887 | 3/1971 | Jacobs et al. | 222/70 |
| 3,671,020 | 6/1972 | Krup | 259/10 |
| 4,141,316 | 2/1979 | Grun | 118/303 |
| 4,324,494 | 4/1982 | Pryor et al. | 222/129.3 |
| 4,443,109 | 4/1984 | Watts | 222/413 |
| 4,458,829 | 7/1984 | Greenfield et al. | 222/129.3 |
| 4,488,664 | 12/1984 | Cleland . | |
| 4,660,741 | 4/1987 | Kirschner et al. | 222/190 |
| 4,718,579 | 1/1988 | Brody et al. | 222/129.4 |
| 5,207,358 | 5/1993 | Bisker | 222/189.06 |
| 5,312,020 | 5/1994 | Frei | 222/129.1 |

*Primary Examiner*—Joseph A. Kaufman
*Attorney, Agent, or Firm*—Frank J. McGue

[57] ABSTRACT

A beverage dispensing apparatus is provided for mixing and discharging a beverage made of liquid and powder into a container. The beverage dispensing apparatus comprises a controller which directs a consistent water flow and a predetermined quantity of powder to a bowl having an impeller blade that stores a predetermined quantity of mixed beverage. The dispensing of the beverage is provided by a dumping valve mounted proximate to the bottom of the bowl. The dumping valve dispenses the contents of the bowl into a container when activated. Sensors are mounted in the bowl and connect the outlet pump and powder auger motor to the controller whereby a replacement beverage is made simultaneously with the dispensing of the contents of the bowl.

23 Claims, 7 Drawing Sheets

BEVERAGE DISPENSING APPARATUS HAVING CONSISTENT MIX DELIVERY OF BEVERAGE TO CONTAINER

RELATED APPLICATION

This is a continuation of provisional application Ser. No. 60/034,070 filed on Dec. 24, 1996.

TECHNICAL FIELD

This invention relates to the field of beverage dispensing apparatus, and, more particularly, to beverage dispensing apparatus which mix powder and liquid thereby forming the beverage which is subsequently dispensed to the user.

BACKGROUND OF THE INVENTION

In general, the use of beverage dispenser apparatus with heavily sugared powders has been less than satisfactory because of the inability to properly dissolve the sugar. This is particularly problematic in the fast serve environment that the food service industry now demands, for example, restaurants, cafeterias, convenience stores, and fast food establishments. The present invention addresses these concerns.

Various types of beverage dispensing apparatus are well known in the art.

U.S. Pat. No. 4,718,579 entitled "Beverage Dispensing Machine" which issued on Jan. 12, 1988 Brody et al. combines powdered beverage mix containing sugar substitutes such as aspartame and water in a first mixing chamber, provides additional dispersion an solubilization in one or more additional mixing chambers. The mixture is then gravity fed into a reservoir. The reservoir has no additional mixing or stirring capability to aid in the dissolution of the beverage.

U.S. Pat. No. 4,488,664 entitled "Beverage Dispensing Machine" which issued on Dec. 18, 1984 to Cleland discloses an add on device for those fruit beverage dispensing machines that are equipped with a tank and a beverage circulation pump. The Cleland adaptation to an existing beverage dispensing system includes a mixing chamber I and storage tank T, a concentrate hopper H using an auger 60 used to supply powder to the mixing chamber, water supply means W providing water to the mixing chamber, a control circuit K which includes liquid level sensing means L including high and low level sensors.

U.S. Pat. No. 3,671,020 entitled "Apparatus for Producing a Beverage by Mixing a Powdered Base Including Sugar and a Cold Liquid" which issued on Jun. 20, 1972 to Krup show an alternate method of whipping and suspending the beverage. This delayed delivery of measurable suspended beverage results in overruns of the container.

The known prior art has neither achieved commercial success nor disclosed the combination set forth herein.

SUMMARY OF THE INVENTION

It is an object of this invention to provide a beverage dispensing apparatus which effects full solubilization of heavily sugared powders with instant start and stop delivery, for rapid and consecutive use.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
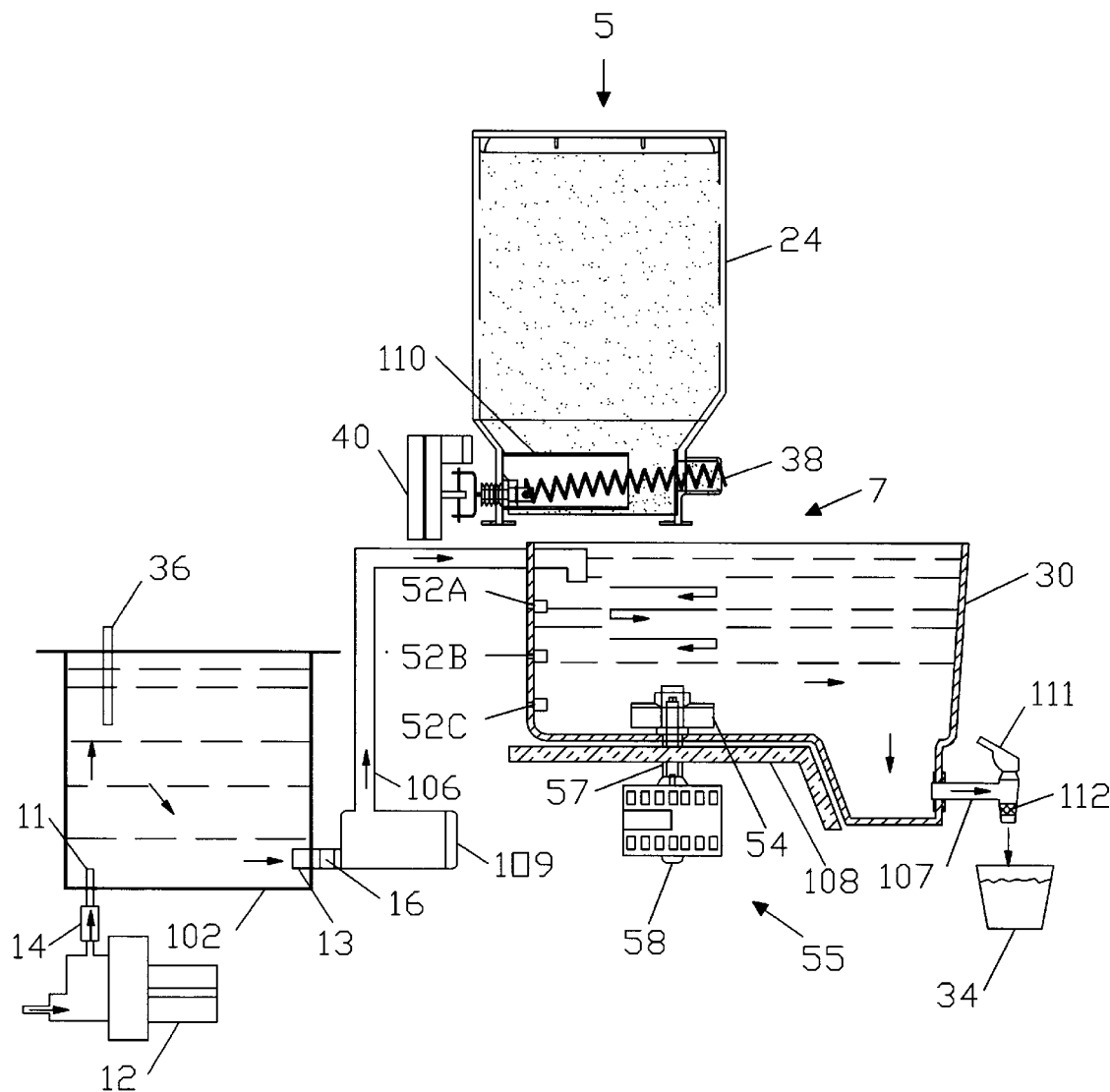
FIG. 1 is a schematic side view of various components of a beverage dispensing apparatus in accordance with the present invention.

Referring more particularly to the drawings by characters of reference, FIG. 1 discloses one embodiment of a beverage dispensing apparatus 5 in accordance with the present invention. It may be seen that a single water storage tank 102 is connected by various water conduits to other parts of beverage dispensing apparatus 5. Water storage Tank 102 is designed to store water for and communicate with each beverage dispensing unit 7 of the dispenser apparatus 5.

It is contemplated that the beverage dispensing apparatus 5 of the present invention will have the capability of servicing one or more beverage dispensing units 7. However, for simplicity, the description will be limited to water storage tank 102 in cooperation with a single dispensing unit 7 of the total beverage dispensing apparatus 5.

FIG. 1 shows water storage tank 102 having an inlet 11 connected to a remote water source (not shown) via an inlet valve 12 by water conduit line 14. An outlet line 13 of water storage tank 102 is connected by a conduit line 16 to an adjustable outlet pump 104 and by a water conduit line 106 to bowl 30. Water storage tank 102 is provided with a water level sensor 36 operatively connected to inlet valve 12 to ensure that the appropriate water level is maintained in water storage tank 102 at all times. The function of water storage tank 102 is to maintain an accurate water flow rate under conditions where the incoming water pressure may change or differs from location to location.

The importance of providing an accurate water flow rate cannot be over-stressed since changes in water flow rates detrimentally affect the desired water-powder ratio. Water storage tank 102 holds water in quantities exceeding the normal quantities of water needed to simultaneously provides water for beverages at several beverage dispensing units 7. In addition, water storage tank 102 has automatic refill capability via water level sensor 36 and inlet valve 12. Thus, water storage tank 102, in conjunction with adjustable outlet pump 109 provides consistent water flow rates to bowl 30 so that the required water to powder ratio is always maintained.

Moreover, since the water in water storage tank 102 is typically retained therein for a period of time, it has an increased opportunity to reach ambient temperature in contrast to water coming directly from a remote supply. Water from the later source often varies in temperature which can result in inconsistent dissolution rates and detrimentally affect the taste of the dispensed beverage.

Figure 4:
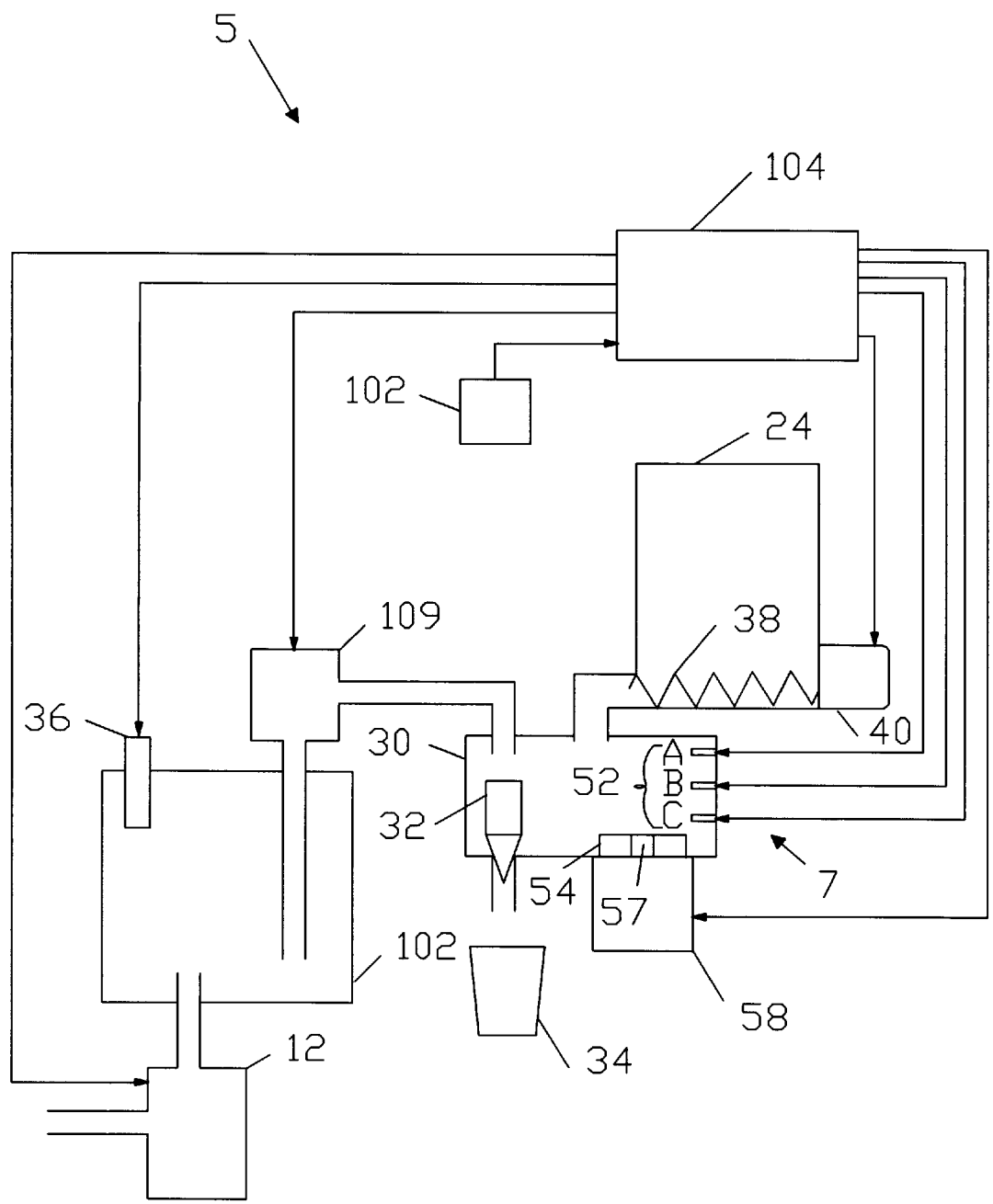
FIG. 4 depicts in a box diagram the controls of the various pumps valves and liquid detection components of the present invention.

In the presently preferred embodiment of FIGS. 1 and 4, hopper 24 is positioned above and moves the predetermined quantities of powder directly into bowl 30. Bowl 30 stores a predetermined quantity of beverage which is continuously stirred by impeller 54. Bowl 30 has a sufficient capacity to fill a cup of predetermined volume with a beverage and allows a certain set period for the beverage to be stirred by impeller blade 54 and to reach a proper ph level before being dispensed. Additionally, sensors 52 are tied to a controller that controls the starting and stopping of adjustable outlet pump 109 and the operation of adjustable auger motor 40 so that a replacement beverage mix of the proper ratio is being made simultaneously with the dispensing.

The controls of beverage dispenser apparatus are shown schematically in FIG. 4. An on/off switch 102 controls the source of electrical power for dispenser apparatus 5, and, more specifically, a controller 104. Controller 104 is in electrical communication with inlet water sensor 36 located in water storage tank 102. When the water level in water storage tank 102 is too low, controller 104 energizes inlet valve 12 which allows water to flow through water conduit line 14 to refill water storage tank 102 or, in the alternate embodiment of FIGS. 10 and 11, gravity feed reservoir 10. When sensor 36 indicates to controller 104 the water level in gravity feed reservoir 10 or storage tank 102 is adequate, inlet valve 12 is deactivated thereby stopping the flow of water into gravity feed reservoir 10 and water storage tank 102 via conduit 14.

In the preferred embodiment of FIG. 1, storage tank 102 is provided with water level sensor 36 operatively connected to inlet valve 12 to ensure that a sufficient amount of water is maintained in tank 102 at all times. Since the consistency of the flow rates are controlled by adjustable pump 109 and not the head pressure of gravity feed reservoir 10, tank 102 can be of any shape or configuration as desired. With absolutely no consideration given to hydraulic head, elevation of tank or its location within the beverage dispenser.

Figure 9:
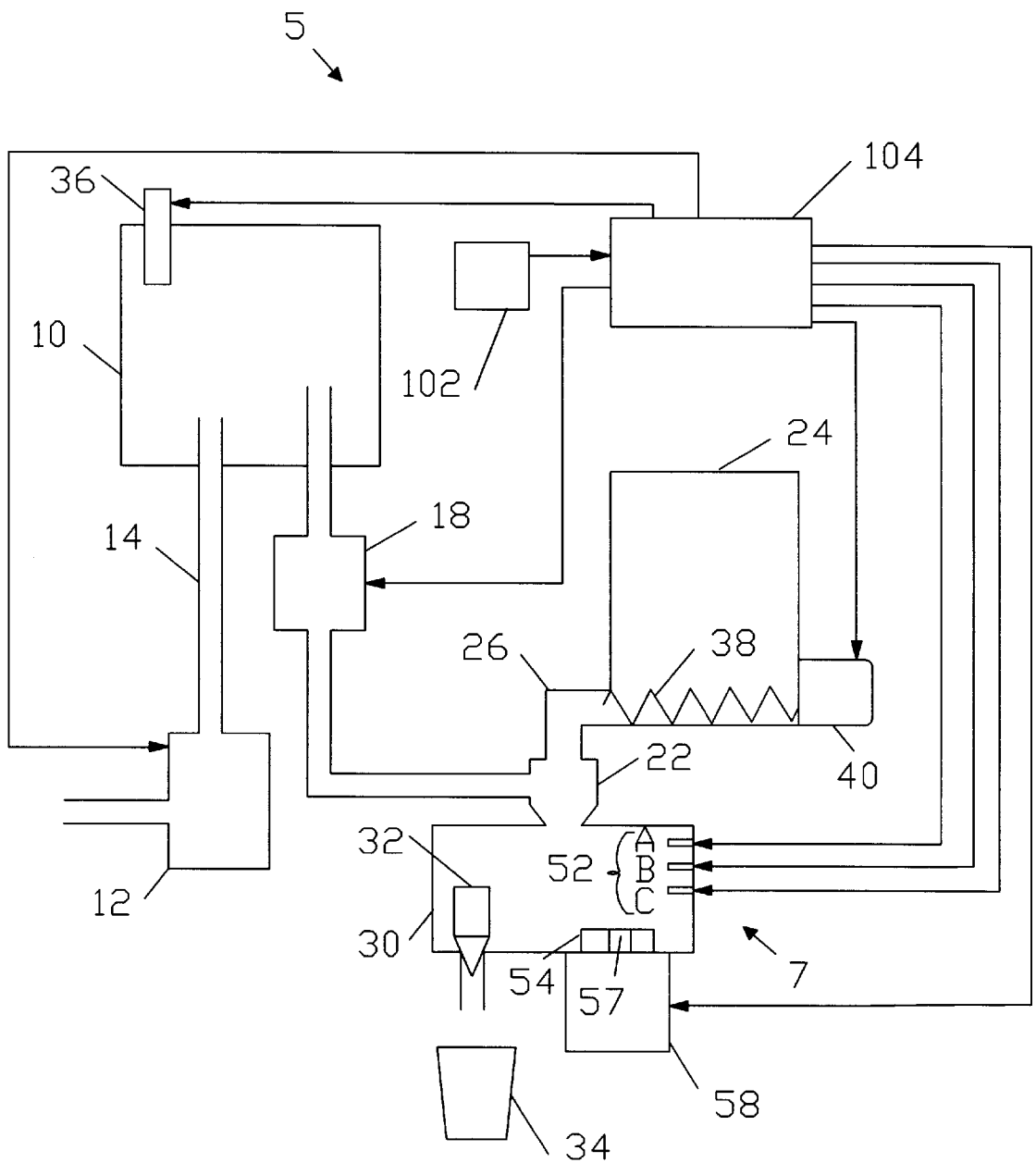
FIG. 9 depicts a box diagram and controls of an alternate embodiment of the present invention.
Figure 10:
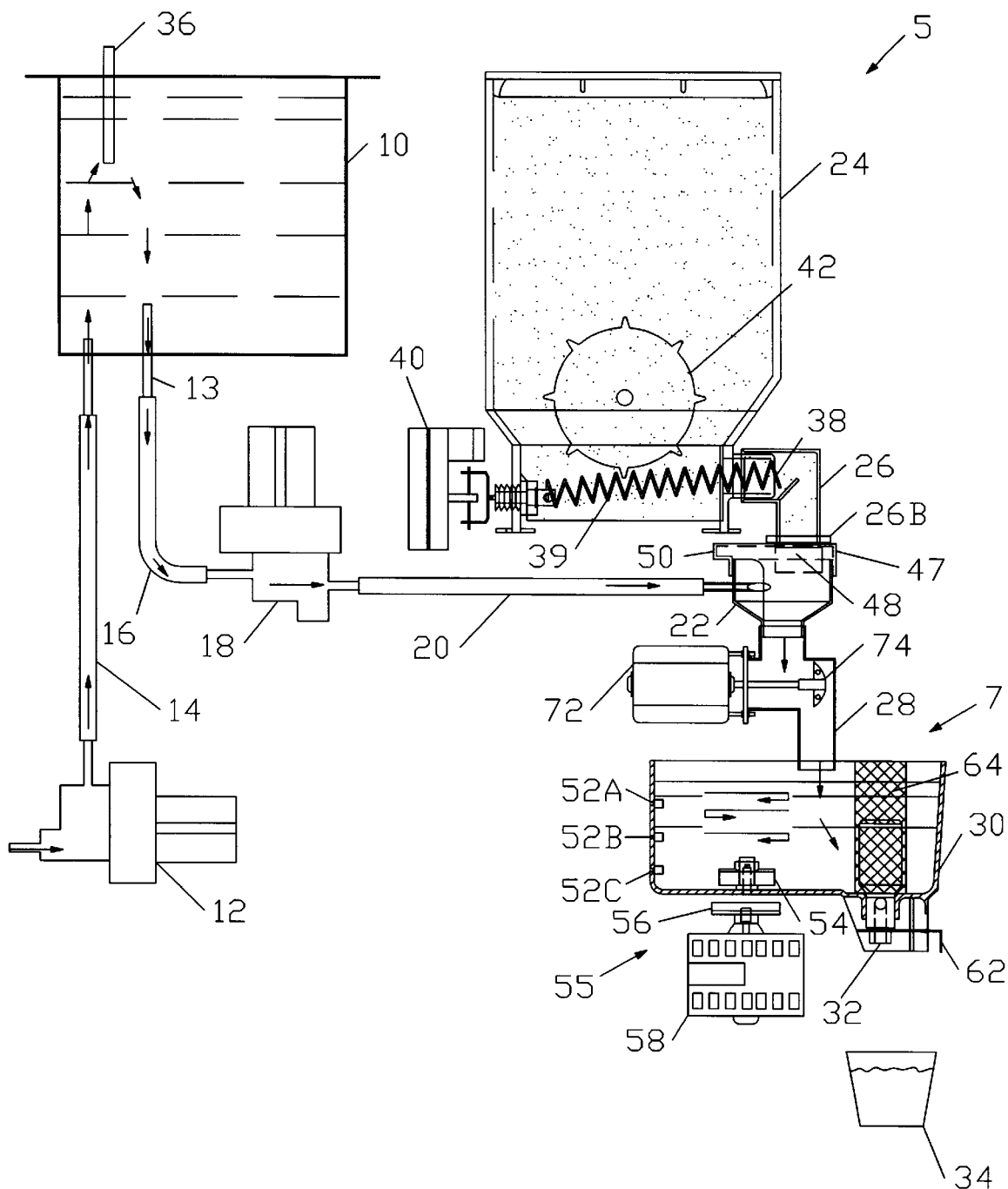
FIG. 10 depicts schematically in side view of still another embodiment of the present invention.

In the alternate embodiment best depicted in FIGS. 9 and 10, gravity feed reservoir 10 is replaced by water storage tank 102, best depicted in FIGS. 1 and 4. Outlet line 13 of storage tank 102 is connected to an adjustable outlet pump 109. Adjustable pump 109 is then connected by water conduit 106 directly to bowl 30. This embodiment is preferably in that storage tank 102 can be located within dispenser 5 in any location or in any shape that best configures the cabinet design.

In contrast, use of gravity feed reservoir 10 mandates a location near the top to allow gravity to feed the water at the flow rate required by the powder manufacturer to deliver to either mixing funnel 22 or bowl 30. In addition, gravity feed reservoir 10 requires a wider and longer shape, and hence larger capacity, to maintain adequate head pressure to provide the required water flow. For example, the use of gravity feed reservoir 10 in combination with three or more dispenser units 7 would require a four to five gallon (about 40 to 50 pounds of water) reservoir capacity. This top heavy configuration may lead to potential safety issues in some uses. The before mentioned top heavy condition is exasperated, considering that it is also mandatory that the powder hoppers be located in the upper half of the beverage dispenser. This adds an additional 25 to 30 pounds to an already somewhat hazardous condition.

Hopper 24 as see in FIG. 10 is positioned above funnel 22 and stores a quantity of powdered concentrate that is moved in predetermined quantities to a funnel elbow 26 leading to funnel 22. Optionally positioned below and in communication with funnel 22 is a mixing chamber 28.

Mixing chamber 28, in turn, is positioned above and in communication with a bowl 30 that stores a predetermined quantity of beverage which is continually agitated by an impeller blade 54. Blade 54 provides for the continuance of the dissolution process for the water containing some undissolved powdered concentrate. Bowl 30 via a dumping valve 32 dispenses the beverage into a container 34.

Hopper 24 and variations in design of hopper 24 are well known and widely used in the art of powder beverage dispensers.

Powder hoppers are readily available in variety of design considerations from manufacturers such as Vending Equipment Supply Incorporated.

As seen in FIG. 1 and 10 hopper 24 typically will retain powder that is desirably dry in nature and easily metered in precise amounts. Required powder gram throws vary from more than 30 for sugar products, to less than one gram for aspartame powders. To match required mix ratios the flow rate of the water entering funnel 22 or directly to bowl 30 is a mandatory 2 ounces per second or greater flow rate. Adjustable auger motor 40 provides the most accurate and consistent mix ratio in this application. Prior art reveals the use of constant speed auger motor with an adjustable outlet water valve in an attempt to achieve the recommended powder to water mix ratios. An auger mechanism 38, driven by adjustable auger motor 40, is mounted to and extends across the bottom of hopper 24. A toothed wheel 42 mounted for rotational movement within hopper 24 engages the auger mechanism 38 and assists in dissemination of powder into helix 39 of auger mechanism 38. The combination of auger 38 and toothed wheel 42 provides for a smooth and metered flow of powder into bowl 30 or one end of elbow 26. The other end of elbow 26 directs the powder into funnel 22 for mixing with the water.

Figure 6:
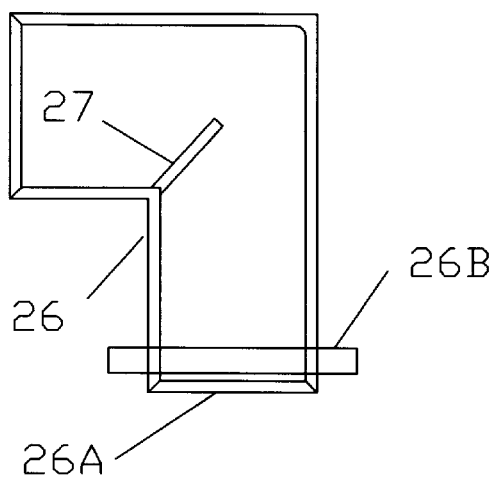
FIG. 6 depicts schematically in side view a hopper elbow used in a beverage dispenser.
Figure 7:
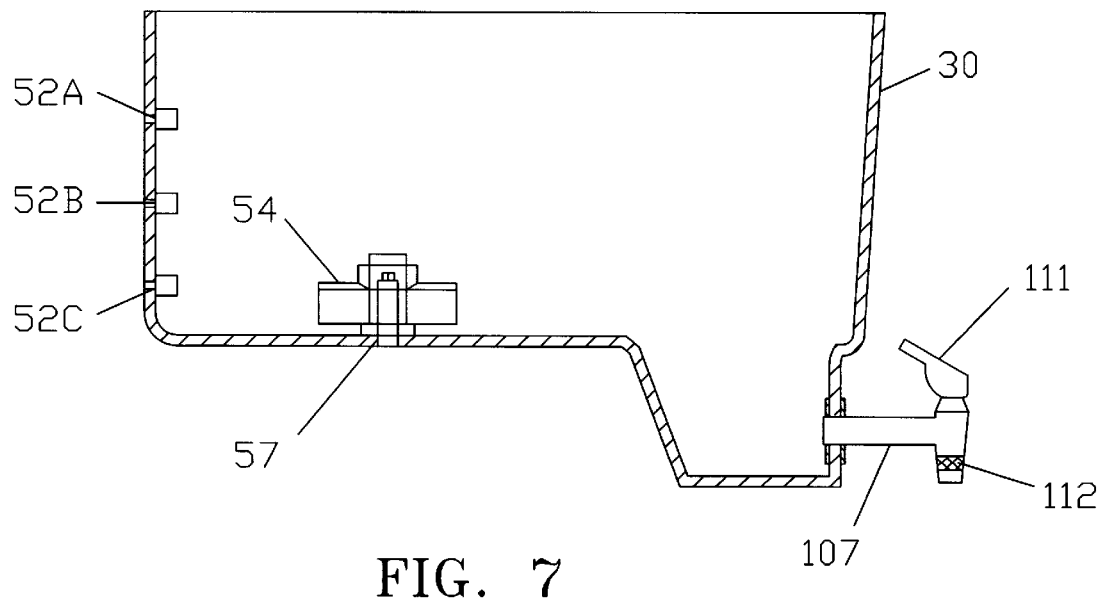
FIG. 7 depicts schematically in side view a bowl with probes and an impeller blade used in a beverage dispenser in accordance with the present invention.
Figure 8:
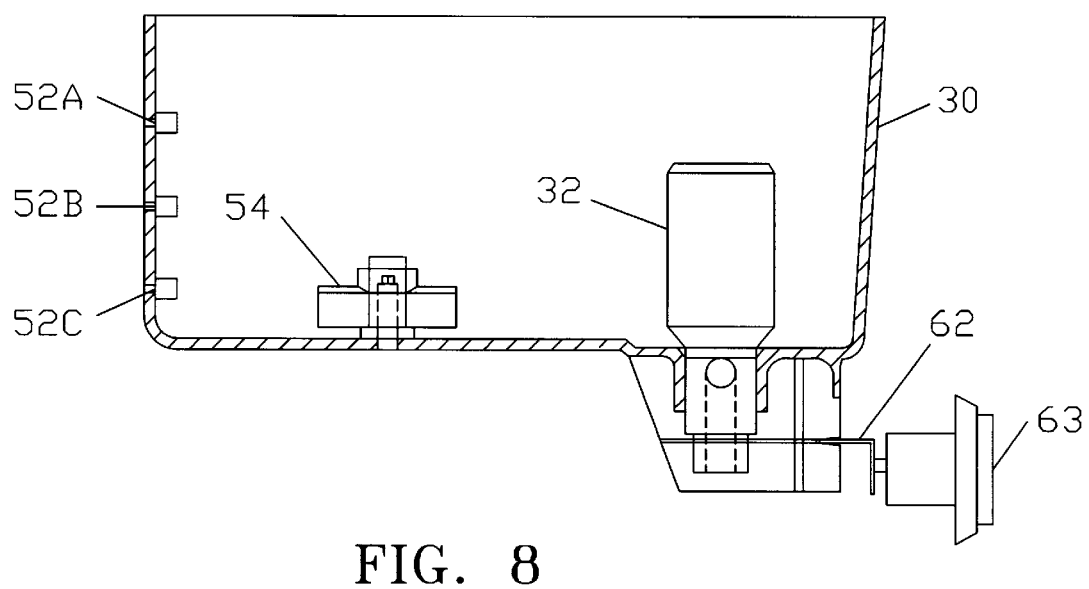
FIG. 8 depicts schematically in side view a dispensing assembly used in an alternate beverage dispenser.

As best seen in FIG. 6, an optional elbow 26 includes a baffle 27 extending inwardly at about a 45 degree angle from the interior radius of elbow 26 to about one half the interior width of the elbow. The purpose of baffle 27 is to prevent incidental spillage of powder, particularly powder having intensive sweeteners such as aspartame therein. Baffle 27 is not generally needed for sugared beverages.

Figure 5:
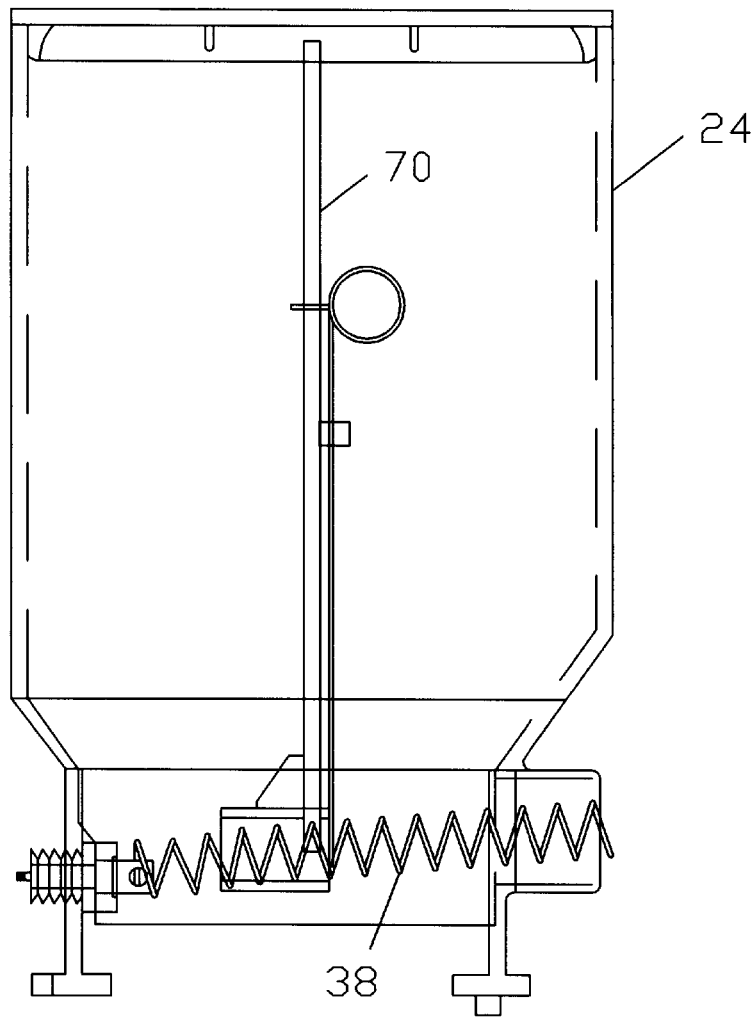
FIG. 5 depicts schematically in side view a hopper used in a beverage dispenser.

When highly concentrated powders are used, for example, when the quantity of concentrate in hopper 24 (typically about 3 to 5 pounds) provides 75 to 100 gallons of beverage, a certain amount of wastage may occur, particularly when the remaining powder in hopper 24 is removed and replaced. This wastage may be considerably reduced by placing a divider insert 70 into hopper 24 as best seen in FIG. 5. Use of insert 70 in hopper 24 cuts down considerably on the powder needed to prime auger mechanism 38 and results in less waste of the residual powder when flavors are changed. Alternatively and preferably, as best seen in FIG. 1, a removable sleeve 110 which extends over the rear portion of auger 38 to the concentrate. Sleeve 110 will cover about 75% of the total length of auger 38.

Figure 2:
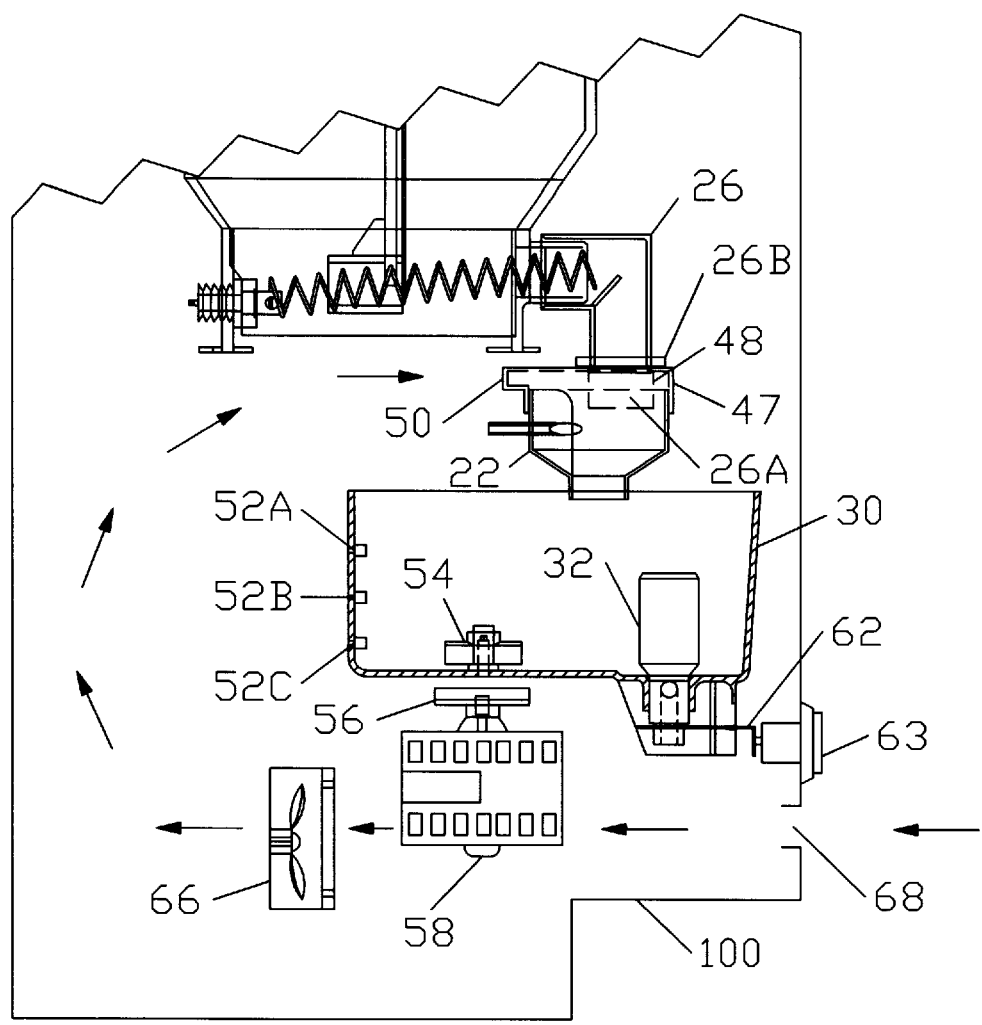
FIG. 2 is a schematic side view of the funnel, bowl and certain internal components of the beverage dispensing apparatus illustrating the flow of drying air to the powder.

Funnel 22 also provides an improved technique for ensuring the dryness of the powder under all conditions. As best seen in FIG. 2, funnel 22 is preferably provided with an elbow ring 26B and a shroud 47 that defines an opening for receiving the distal end 26A of elbow 26. This opening facilitates previously discussed off-centered relationship of elbow 26 with funnel 22. Shroud 47 fits over the upper rim of funnel 22 and, collectively with funnel 22, defines a channel 48 about the upper inner rim of funnel 22. An opening 50 into channel 48 permits the entrance of dry air circulated through the body of dispensing apparatus 5.

It is desirable that the beverage in bowl 30 be at or near a predetermined temperature which in case of non-refrigerated beverages may be close to ambient temperatures. When beverages are being dispensed at rates requiring frequent refilling and replacement of the liquid in bowl 30, the change in temperature of the liquid is minimal.

However, should the liquid be retained in bowl 30 for an extended period of time, (e.g. overnight) the friction caused by impeller 54 will raise the temperature of the liquid which can deleteriously affect the quality of the dispensed drink. Thus, to maintain the beverage at or near the predetermined temperature, the variable speed blender motor 58 may be adjusted by an operator to maximize mix and minimize friction. A cooling fan 66 may be installed within housing 100 to draw air from the surrounding atmosphere through louvers 68 mounted in the front of housing 100. The cooling air is drawn over the impeller motor 58 and along the bottom of bowl 30 exchanging heat therewith. A portion of the warm air, and therefore relatively dryer air, vents into opening 50 and into the elbow 26 thus keeping the powder essentially moisture free. Those skilled in the art will also recognize that refrigeration is also an option to maintain the temperature. Flow rates of powder and water may need adjustment in light of the cooler temperatures.

Alternatively or conjunctively, as best seen in FIG. 1, an insulation barrier 108 may be placed between the variable speed motor 58 and the base of bowl 30.

Figure 3:
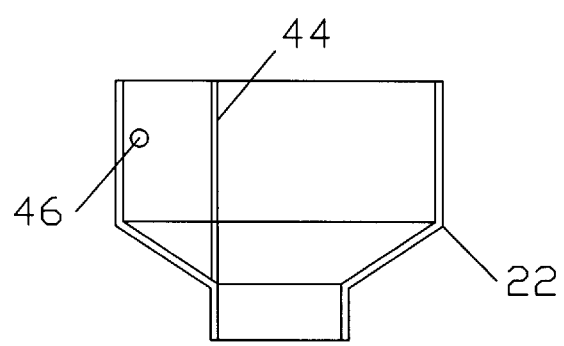
FIG. 3 depicts a side view of the funnel.

Funnel 22 serves a pair of significant functions. The primary function of funnel 22 is to start the process of mixing the powder into the water. As best seen in FIG. 3, funnel 22 is provided with a diverting flange 44 extending out from the inner surface of funnel 22 at a position adjacent to a water entrance 46. As shown, flange 44 is essentially parallel to the axis of entrance 46 and extends essentially across the radius of funnel 22. Water entrance 46 is positioned such that it directs the incoming water to centrifuge about the inner surface of funnel 22.

To prevent the powder from dropping directly into the center of the vortex formed by the circulating water, the opening into the lower distal end of elbow 26 is offset from The central vertical axis of funnel 22. The water centrifuges about the inner surface of funnel 22 and impacts the side of flange 44. The kinetic energy of the circulating water is dissipated by the impact against flange 44 thereby causing the water to drop through funnel 22 to mixing chamber 28, if present, or to bowl 30 if chamber 28 is not present. Use of flange 44 minimizes undesirable upward surges of water within funnel 22 experienced in the absence of flange 44, thus eliminating the need for large profile mix funnels used by the prior art beverage mixers and dispensers to solve the upsurge problem.

As seen in FIG. 1 and 10, bowl 30 has a sufficient capacity to fill a cup of predetermined volume with a beverage and allow a certain set period for the beverage to reach a proper ph level before being dispensed. Liquid level sensors 52 are provided to ensure that when a beverage is being dispensed into a cup that the additional mix is immediately being made at a rate sufficient to replace that which is being dispensed. Thus, sensors 52 are tied to a controller that controls the opening and closing of the outlet valve 18 FIG. 10 and the adjustable outlet pump of FIG. 1. Additionally the controller starts adjustable auger motor 40 so that a replacement beverage mix of the proper ratio is being made simultaneously with the dispensing. A typical beverage dispense rate is 2 ounces (2 oz) per second or greater.

In some situations where high sugar content powders are used and agents to assist in dissolution are absent, sugar granules swirling about bowl 30 from freshly introduced beverage mix, will exit out of dump valves 107 and 32 into container 34. It is desirable then to complete the dissolution of the sugar particles before dispensing into a waiting container 34.

The preferred embodiment of dump valve 107 is manufactured by Thomlinson Corporation as seen in FIG. 1 and 6, is a well known and widely used dump valve for beverage dispensers. It is manually operated by raising or depressing dump valve handle 111. When actuated dump value 107 provides an instant start and stop at the required beverage dispense rate. Dump valve 107 comes equipped from Thomlinson Corporation with a spring loaded plunger seat to insure a drip free dispense valve. Additionally from the manufacturer, dump valve 107 is fitted with an aerator screen 112 to separate and hold back swirling granular sugar mix and any other foreign material from container 34.

Dump valve 32 of FIG. 10 is positioned at the from bottom of bowl 30 and is either mechanically or electrically connected to a drink dispenser bar 62 initiated by a button 63 mounted on the front of the dispenser as show in FIG. 2. Dump valve 32 provides for dispensing of the beverage with no delay and such dispensing is stopped instantly with the release of button 63. It has been found advantageous to use an optional screen member 64, which separates dump valve 32 from the greater volume of swirling granular sugar mix and container 34.

In some situations where the dissolution of powder into the water is not rapid, it may be necessary to utilize whipping chamber 28. A whipping motor 72 drives a high velocity rotating blade 74 that assists in the dissolution of the powder into the water. The use of whipping chamber 28 finds particular utility in situations where the sugar content of the powder is high, and little or no dissolving compounds or agents are provided in the powder. In other situations, it may not be necessary to have whipping chamber 28 so that the mix from funnel 22 is funneled directly into bowl 30 as seen in FIG. 2.

It is important to note that the combination of funnel 22, mixing chamber 28 and bowl 30 less impeller 54 may not be sufficient to insure the completion of the dissolution process of heavily sugared beverage mixes.

To ensure completion of the dissolution process, impeller blade 54 is mounted for high speed rotation on the bottom wall of bowl 30. Impeller blade 54 may be the upper component of a blender 55 which allows the operator of the apparatus to adjust the speed of said motor is mounted within a housing 100 best seen in FIG. 2. Impeller blade 54 runs continuously while the beverage dispenser unit 7 is operating to complete the dissolution process and to ensure that the mix ratio remains consistent. Those skilled in the art will recognize other means of mixing this beverage to final solution, as for example, sonic vibration, air injection, pump circulation, or as best seen in FIG. 2, a magnetic coupler 56 for driving impeller blade 54.

It will be understood by those skilled in the art that water storage tank 102 represents the preferred embodiment of an inlet water system when less than desirable inlet source water pressures are at minimal operating standards. If the inlet water pressure is sufficient and consistent, water storage tank 102 may be omitted. Inlet valve 12 and conduit 14 are directly connected to outlet valve 18.

Controller 104 is also in electrical communication with liquid level sensors 52a–c located in bowl 30. In the preferred embodiment of FIG. 1, when the beverage level falls below low liquid level sensor 52a, controller 104 will activate adjustable outlet pump 109 and adjustable auger motor 40 thereby delivering water and powder to bowl 30 as previously described. When the beverage level in bowl 30 reaches high liquid level s sensor 52a, controller 104 will deactivate both adjustable outlet pump 109 and adjustable auger motor 40.

In the embodiment of FIGS. 10 and 11, controller 104 is also in electrical communication with liquid level sensors 52a–c located in bowl 30. In this alternate embodiment, when the beverage level falls below low liquid level sensor 52a, controller 104 will activate outlet valve 18 and adjustable auger motor 40 thereby delivering water and powder to bowl 30 as previously described. When the beverage level in bowl 30 reaches high liquid level sensor 52a, controller 104 will deactivate both outlet valve 18 and adjustable auger motor 40.

When the blender motor liquid level sensor 52b completes a circuit with liquid level sensor 52c located near the bottom of bowl 30, controller 104 activates variable speed blender motor 58. If the beverage level is below sensor 52b, controller 104 will deactivate variable speed blender motor 58.

Although only certain embodiments have been illustrated and described, it will be apparent to those skilled in the art that various changes and modifications may be made therein without departing from the spirit of the invention or from the scope of the appended claims, as, for example, refrigeration.

What is claimed is:

1. A beverage dispensing apparatus for mixing and discharging a beverage made of a liquid and a powder, the beverage dispensing apparatus comprising:

a controller, means for providing a consistent water flow to a bowl operatively connected to the controller;

means for providing a predetermined quantity of powder to the water flow operatively connected to the controller;

the bowl storing a predetermined quantity of beverage, the bowl having an impeller blade driven by a variable speed motor mounted therein operatively connected to the controller whereby the variable speed motor maximizes powder dissolution and minimizes temperature increase of the beverage due to friction;

a dumping valve proximately mounted to the bottom of the bowl, the dumping valve dispensing the contents of the bowl into a container when activated; and a pair of liquid level sensors mounted in the bowl operatively connecting to the controller whereby a replacement beverage is made simultaneously with the dispensing of the contents of the bowl.

2. The beverage dispensing apparatus of claim 1 wherein the means for providing a predetermined quantity of powder comprises:

a hopper positioned above the bowl, the hopper storing a quantity of powder, an auger mounted to and extending across the bottom of the hopper, said auger having an adjustable motor operatively connected thereto, the adjustable motor being operatively connected to the controller.

3. The beverage dispensing mechanism of claim 2 further comprising an elbow having an internal baffle which receives powder from the auger mechanism and directs the powder to the bowl.

4. The beverage dispensing apparatus of claim 2 further comprising means for reducing wastage from the hopper.

5. The beverage dispensing apparatus of claim 4 wherein the means for reducing wastage from the hopper comprises a removable sleeve partially covering the auger.

6. The beverage dispenser of claim 4 wherein the means for reducing wastage comprises a divider insert mounted in the hopper.

7. The beverage dispensing apparatus of claim 1 wherein one of the liquid level sensors is operatively connected to the controller to ensure that when a beverage is being dispensed additional beverage is immediately made to replace that which is being dispensed and the other of the liquid level sensors operatively connecting the variable speed motor and the controller whereby the impeller blade is only rotated when the level of beverage in the bowl safely reaches the other of the liquid level sensors.

8. The beverage dispensing mechanism of claim 1 wherein the dumping valve operates on an instant stop/start mode and dispenses beverage at a rate equal to or greater than two ounces per second and further wherein the dump valve has a built in screen to prevent undissolved powder from exiting the bowl prior to complete dissolution thereof.

9. The beverage dispensing apparatus of claim 1 wherein the means for providing a consistent water flow comprises a gravity fed reservoir having an inlet in liquid communication with a remote water source by an inlet valve operatively connected to the controller, the gravity fed reservoir further having an outlet line having an outlet valve operatively connected to the controller, the outlet line being in liquid communication with the bowl.

10. The beverage dispensing apparatus of claim 9 further comprising a water level sensor mounted in the gravity fed reservoir operatively connected to the inlet valve.

11. The beverage dispensing apparatus of claim 9 wherein the gravity fed reservoir holds water in quantities exceeding the normal quantities of water needed to simultaneously provide water the one or more outlet valves connected to one or more dispensing stations.

12. The beverage dispensing apparatus of claim 1 further comprising a whipping chamber.

13. The beverage dispensing apparatus of claim 1 further comprising a screen member which isolates the dumping valve from undissolved powders in the bowl.

14. The beverage dispensing apparatus of claim 1 further comprising a housing enclosing the apparatus.

15. The beverage dispenser of claim 14 further comprising a cooling fan which draws air from surrounding atmosphere along the bottom of the howl motor exchanging heat therewith.

16. The beverage dispensing apparatus of claim 1 further comprising:

a mixing funnel positioned above and in liquid communication with the bowl, the mixing funnel receiving the powder and the consistent water flow; the mixing funnel further having means for centrifuging the consistent water flow about the inner surface of the mixing funnel.

17. The beverage dispensing mechanism of claim 16 wherein the means for centrifuging includes a water entrance which directs water from the means for providing a consistent water flow into the mixing funnel, the water entrance being positioned such that it directs the incoming water to centrifuge about the inner surface of the mixing funnel.

18. The beverage dispensing apparatus of claim 16 further comprising a diverting flange mounted essentially parallel to the axis of the water entrance and extending essentially across the radius of the mixing funnel.

19. The beverage dispensing apparatus of claim 16 further comprising a shroud that defines openings for receiving the water and the powder, the shroud further defining a channel about the upper inner rim of the mixing funnel thereby permitting dry air to circulate through the beverage dispensing apparatus.

20. A beverage dispensing apparatus for mixing and discharging a beverage made of a liquid and a powder, the beverage dispensing apparatus comprising:

a controller, means for providing a consistent water flow to a bowl operatively connected to the controller;

a hopper positioned above the bowl, the hopper storing quantity of powder, an auger mounted to and extending across the bottom of the hopper, said auger having an adjustable motor operatively connected thereto, said auger being operatively connected to the controller, a toothed wheel mounted for rotational movement within the hopper, the toothed wheel engaging the auger and assisting in dissemination of powder into the auger, the bowl that stores a predetermined quantity of beverage, the howl having a impeller blade driven by a variable speed motor mounted therein;

a dumping valve proximately mounted to the bottom of the bowl, the dumping valve dispensing the contents of the bowl into a container when activated; and a pair of liquid level sensors mounted in the bowl operatively connecting to the controller whereby a replacement beverage is made simultaneously with the dispensing of the contents of the bowl.

21. A beverage dispensing apparatus for mixing and discharging a beverage made of a liquid and a powder, the beverage dispensing apparatus comprising:

a controller, a water storage tank having an inlet in liquid communication with a remote water source by a inlet valve operatively connected to the controller, the water storage tank further having an outlet line having an adjustable outlet pump operatively connected to the controller, the outlet line being in liquid communication with a bowl;

means for providing a predetermined quantity of powder to the water flow operatively connected to the controller;

the bowl that stores a predetermined quantity of beverage, the bowl having a impeller blade driven by a variable speed motor mounted therein;

a dumping valve proximately mounted to the bottom of the bowl, the dumping valve dispensing the contents of the bowl into a container when activated; and a pair of liquid level sensors mounted in the bowl operatively connecting to the controller whereby a replacement beverage is made simultaneously with the dispensing of the contents of the bowl.

22. The beverage dispensing apparatus of claim 21 further comprising a water level sensor mounted in the water storage tank and operatively connected to the inlet valve and the controller.

23. The beverage dispensing apparatus of claim 21 wherein the storage tank holds water in quantities exceeding the normal quantities of water needed to simultaneously provide water to one or more adjustable outlet pumps.

* * * * *